(12) United States Patent
Vogel (10) Patent No.: US 6,483,840 B1
(45) Date of Patent: Nov. 19, 2002

(54) HIGH SPEED TCP/IP STACK IN SILICON

(75) Inventor: Danny C. Vogel, Sudbury, MA (US)

(73) Assignee: LSI Logic Corporation, Milpitas, CA (US)

( * ) Notice: Subject to any disclaimer, the term of this patent is extended or adjusted under 35 U.S.C. 154(b) by 189 days.

(21) Appl. No.: 09/888,866

(22) Filed: Jun. 25, 2001

(51) Int. Cl.⁷ .......................... G06F 13/00; G06F 15/16
(52) U.S. Cl. .................. 370/401; 370/469; 709/230; 710/105
(58) Field of Search ............................... 370/351, 400, 370/401, 402, 464, 465, 466, 467, 469, 395.2, 389, 420, 392; 710/105; 709/223, 224, 230, 232, 237; 711/117, 118, 119, 120, 121, 122, 123, 125, 126

(56) References Cited

U.S. PATENT DOCUMENTS 5,430,727 A * 7/1995 Callon
5,867,494 A * 2/1999 Krishnaswamy et al.
5,999,525 A * 12/1999 Krishnaswamy et al.
6,034,963 A  3/2000 Minami et al.

* cited by examiner

Primary Examiner—William Luther
(74) Attorney, Agent, or Firm—Christopher P. Maiorana, PC (57) ABSTRACT

A circuit for converting data between communication protocols at different levels of a protocol stack. The circuit generally comprises a first processor and a second processor. The first processor may be configured to convert the data between a first communication protocol and a second communication protocol. The first processor may have a plurality of first rows each having at least one first block each configured to process a portion of the data. At least one of the first rows may have a plurality of the first blocks. The second processor may be configured to convert the data between the second communication protocol and a third communication protocol. The second processor may have a plurality of second rows each having at least one second block each configured to process a portion of the data. At least one of the second rows may have a plurality of the second blocks.

19 Claims, 12 Drawing Sheets

FIG. 1

| Ver | IHL | TOS | Length | |
|-----|-----|-----|--------|---|
| ID | | | Flag | Offset |
| TTL | | Protocol | Checksum | |
| Source Address | | | | |
| Destination Address | | | | |
| Options (variable in size) | | | | |

Data (variable in size)

HIGH SPEED TCP/IP STACK IN SILICON

FIELD OF THE INVENTION

The present invention relates to network protocol processing generally and, more particularly, to a Transmission Control Protocol/Internet Protocol stack processing in silicon.

BACKGROUND OF THE INVENTION

Firmware-based Transmission Control Protocol (TCP)/Internet Protocol (IP) processors fabricated using existing technology have achieved processing speeds for network data of 100 megabits per second (Mbps). Application specific network processor circuits have achieved processing speeds of 1 gigabit per second (Gbps). Advancements in the Ethernet bus and similar buses require data rate processing speeds of at least 10 Gbps.

The application specific network processor circuits operating on byte-wide data streams must be clocked at 125 megahertz (MHz) to achieve the 1 Gbps processing rate. Scaling the application specific network processor circuits to 10 Gbps requires increasing the clock to 1.25 gigahertz (GHz). Current large-scale production technology cannot economically produce application specific network processor circuits that operate at the 1.25 GHz clock rate.

SUMMARY OF THE INVENTION

The present invention concerns a circuit for converting data between communication protocols at different levels of a protocol stack. The circuit generally comprises a first processor and a second processor. The first processor may be configured to convert the data between a first communication protocol and a second communication protocol. The first processor may have a plurality of first rows each having at least one first block each configured to process a portion of the data. At least one of the first rows may have a plurality of the first blocks. The second processor may be configured to convert the data between the second communication protocol and a third communication protocol. The second processor may have a plurality of second rows each having at least one second block each configured to process a portion of the data. At least one of the second rows may have a plurality of the second blocks.

The objects, features and advantages of the present invention include providing a high speed protocol stack processing circuit that may (i) process high network data rates, (ii) operate at existing clock rates, (iii) reduced hardware/silicon requirements, (iv) reduce bus loading, and/or (v) perform parallel operations.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
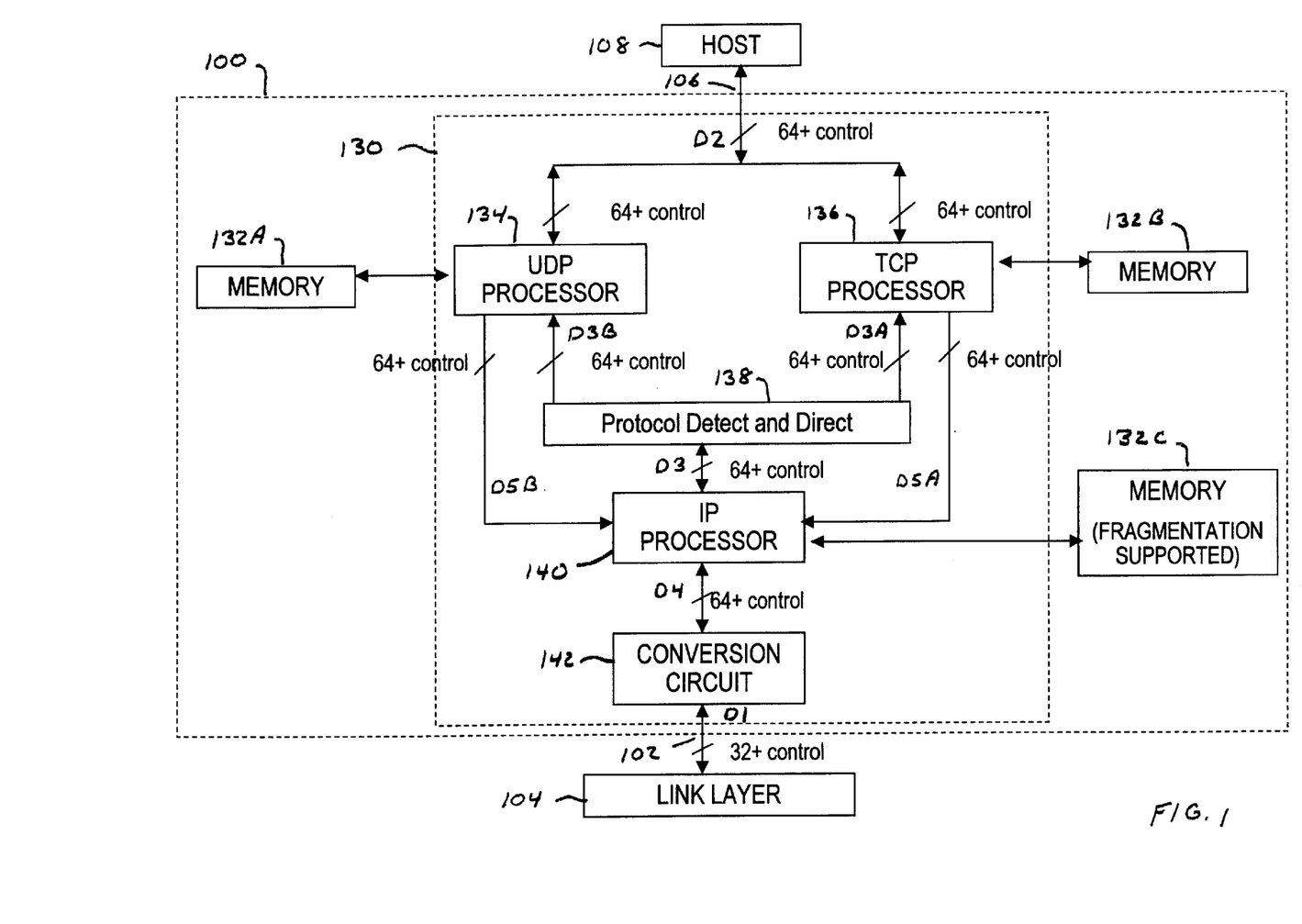
FIG. 1 is a block diagram of an example system implementing the present invention.

Referring to FIG. 1, a block diagram of an example system 100 is shown in accordance with a preferred embodiment of the present invention. The system 100 may have an interface 102 to exchange a signal (e.g., D1) with a link layer 104. The system 100 may have an interface 106 to exchange a signal (e.g., D2) with a host 108. The system 100 may be operational to transform data between the signal D1 and the signal D2. In one embodiment, the system 100 may be a hardware-only implementation without embedded software or firmware.

The link layer 104 may be implemented as a data link layer of a communication protocol stack model. The communication protocol stack model may be a seven-layer Open Systems Interconnection (OSI) model defined by the International Organization for Standardization (ISO), Geneva, Switzerland. Other communication stack protocol models may be implemented to meet the design criteria of a particular application. The host 108 may be implemented as a circuit, a processor, a session layer of the OSI model, a software socket, or the like. The system 100 may connect directly to the host 108, connect through a bus, through some other circuit, or the like. In one example, the connection may be 64 bits wide to move the data at high speeds.

The signal D1 may be implemented as network data organized per a communication protocol. The communication protocol may be a network layer protocol of the OSI model. In one embodiment, the network layer protocol may be an Internet Protocol (IP) as defined by a number 5 standard (STD 5) of the Internet Engineering Task Force (IETF), Reston, Va. The signal D1 may be arranged per other communication protocols to meet the design criteria of a particular implementation.

Figure 2:
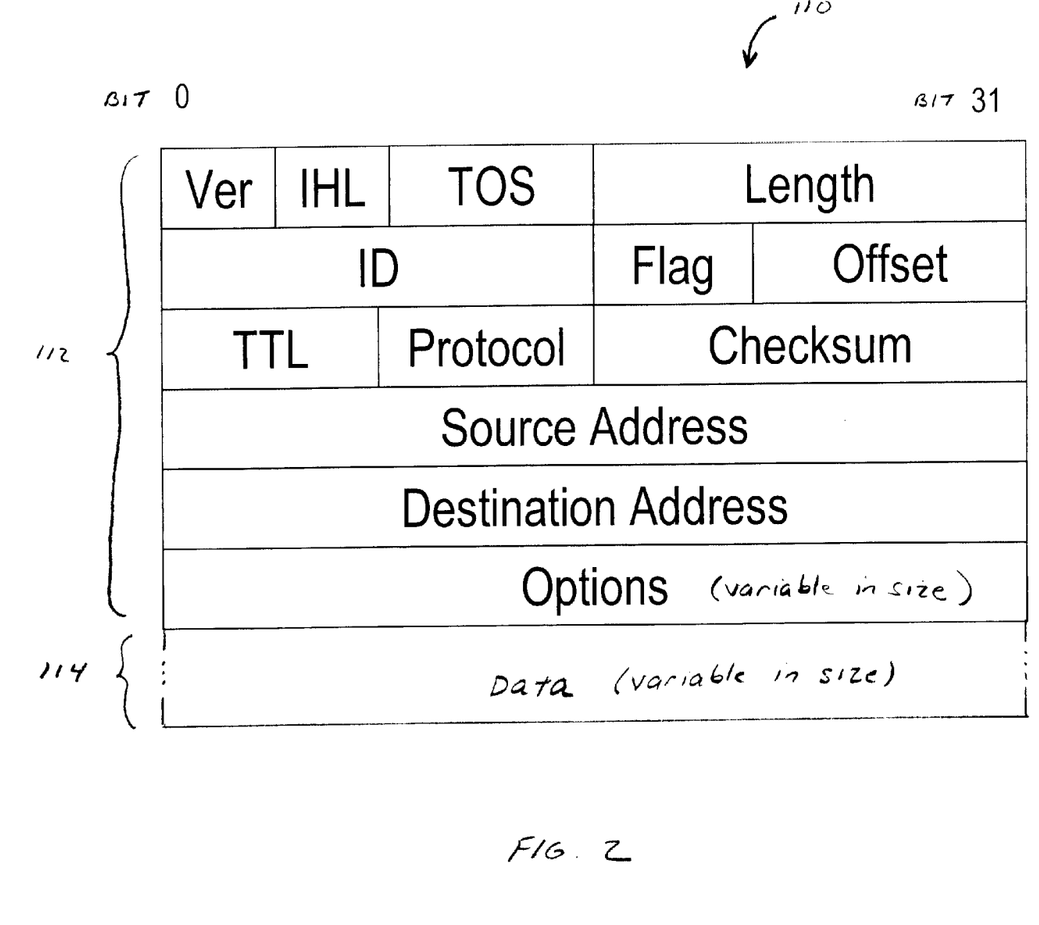
FIG. 2 is a layout of an Internet Protocol (IP) datagram.

Referring to FIG. 2, a layout of an IP packet or IP datagram 110 is shown. The IP datagram 110 is generally arranged within a 32-bit wide boundary or width. The IP datagram 110 may comprise an IP header section 112 and a data payload section 114. The IP header section 112 may define multiple elements or fields holding various header data. The elements may include a version element (e.g., VER), an internet header length element (e.g., IHL) a type of service element (e.g., TOS), a length element, an identification element (e.g., ID), a protocol element, a checksum element, a source address element, a destination address element, and an options element. The data payload section 114 may contain user data.

Referring back to FIG. 1, the system 100 generally comprises a circuit 130 and a circuit 132 (shown as three portions 132A–C). The circuit 130 may be implemented as a processor circuit. The processor circuit 130 may be operational to transform data between the signal D1 and the signal D2 with the aid of the circuit 132. The circuit 132 may be implemented as a memory circuit. The memory circuit portions 132A–B may be used to assist transforming the data between the signal D2 and an internal signal (e.g., D3). The memory circuit portion 132C may be used for fragmentation support where the IP packets 110 may be fragmented among several frames.

The signal D3 may be implemented as network data organized per a communication protocol. The communication protocol may be a transport layer protocol of the OSI model. The transport layer protocol may be implemented as a Transmission Control Protocol (TCP) and/or a User Datagram Protocol (UDP). The TCP protocol may be defined by an IEFT STD 7. The UDP protocol may be defined by an IEFT STD 6. Other communication protocols may be implemented to meet the design criteria of a particular application.

Figure 3:
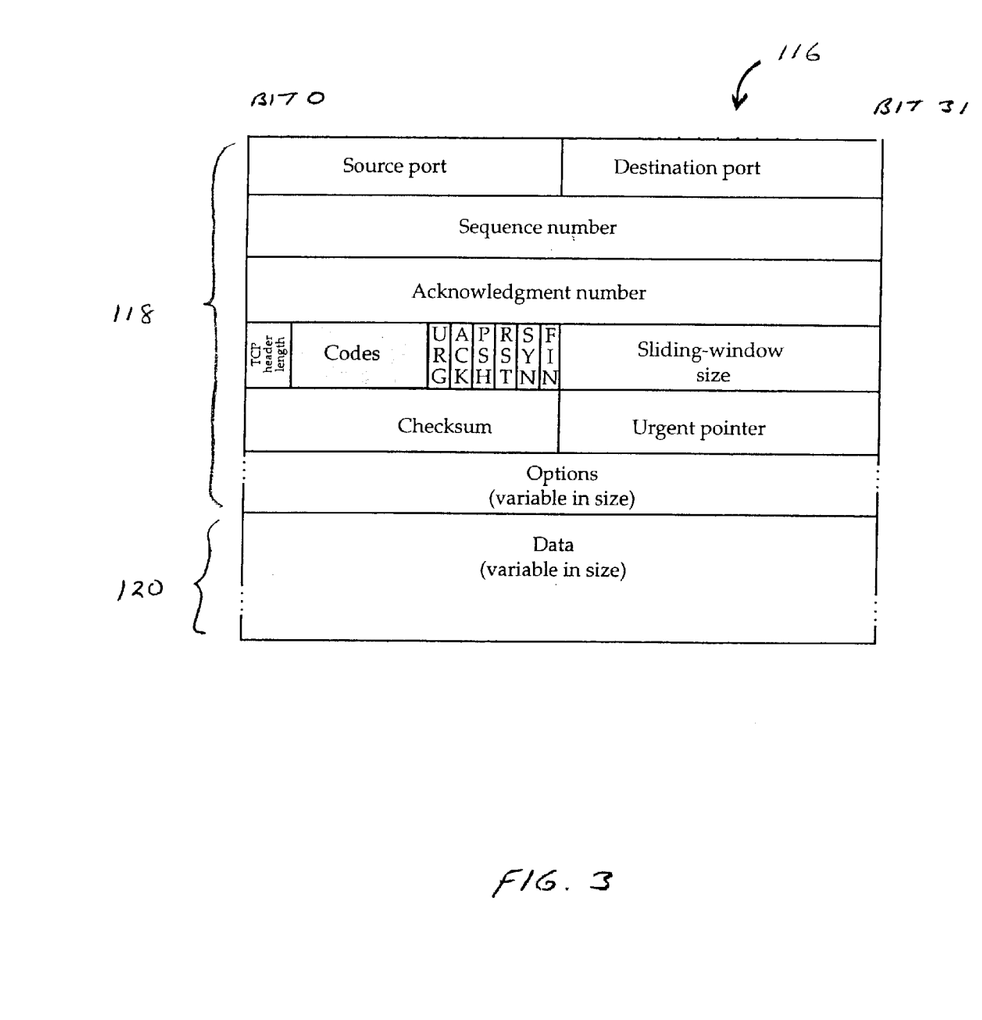
FIG. 3 is a layout of a Transmission Control Protocol (TCP) segment.

Referring to FIG. 3, a layout of a TCP segment 116 is shown. The TCP segment 116 is generally arranged as multiple elements or fields within a 32-bit wide boundary. The TCP segment 116 may comprise a TCP header section 118 and a data payload section 120. The TCP header section 118 may have multiple elements for holding header data. The elements may include a source port element, a destination port element, a sequence number element, an acknowledgment number element, a TCP header length element, a code element, an urgent element (e.g., URG), an acknowledgment element (e.g., ACK), a push element (e.g., PSH), a reset element (e.g., RST), a synchronize element (e.g., SYN), a finish element (e.g., FIN), a sliding-window size element, a checksum element, an urgent pointer element, and an options element. However, the elements may change with protocol enhancements. The data payload section 120 may contain user data.

Figure 4:
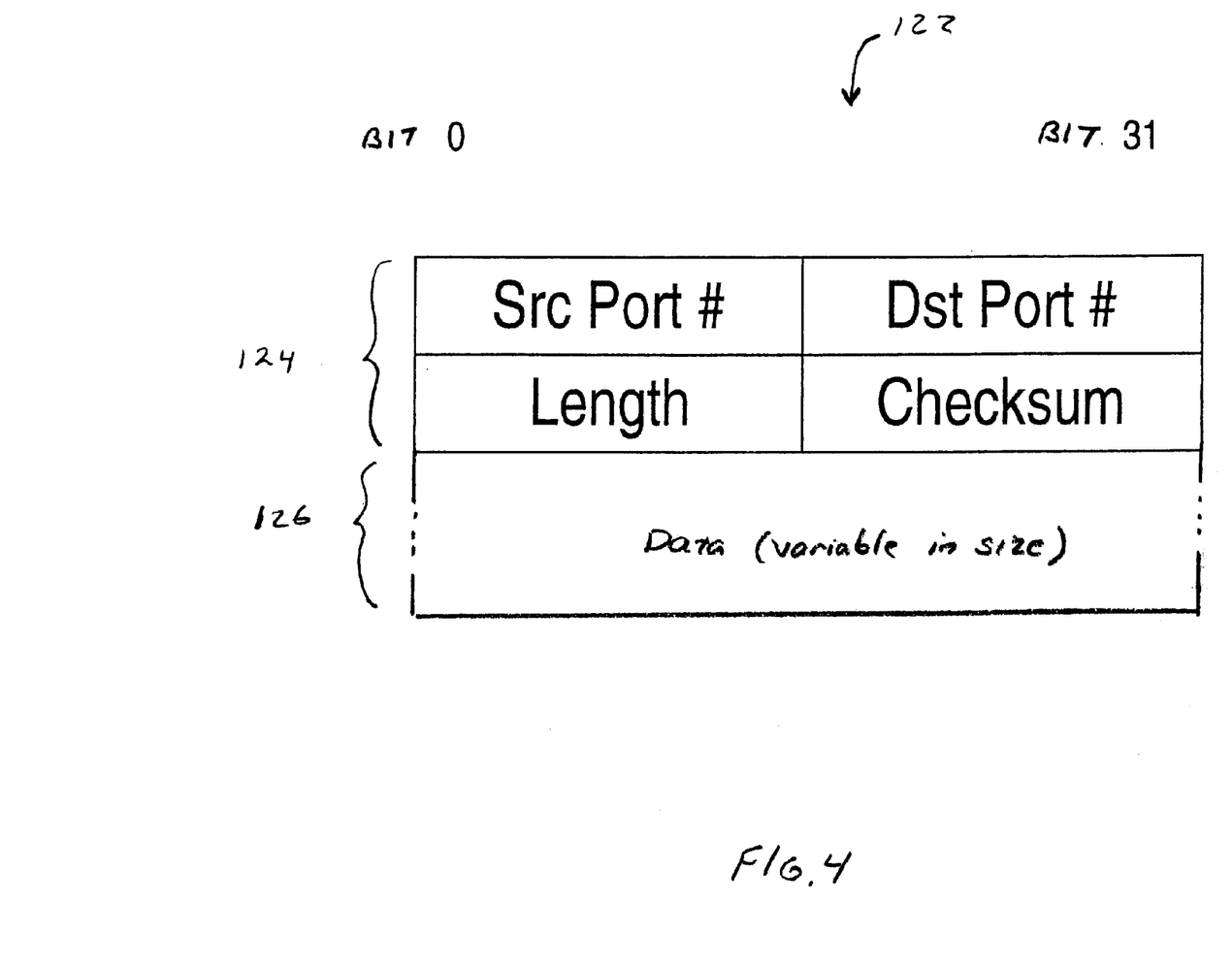
FIG. 4 is a layout of a User Datagram Protocol (UDP) segment.

Referring to FIG. 4, a layout of a UDP segment 122 is shown. The UDP segment 122 is generally arranged as multiple elements or fields within a 32-bit wide boundary. The UDP segment 122 may comprise a UDP header section 124 and a data payload section 126. The UDP header section 124 may have multiple elements for holding header data. The elements may include a source port number element (e.g., SRC PORT#), a destination port number element (e.g., DST PORT#), a length element, and a checksum element. However, the elements may change with protocol enhancements. The data payload section 124 may contain user data.

Returning to FIG. 1, the circuit 130 generally comprises a circuit 134, a circuit 136, a circuit 138, a circuit 140, and a circuit 142. The circuit 134 may be implemented as a UDP processor. The circuit 136 may be implemented a TCP processor. The circuit 138 may be implemented as a protocol detect and direct circuit (or a detect circuit for short). The circuit 140 may be implemented as an IP processor. The circuit 142 may implemented as a conversion circuit. The conversion circuit 142 may be optional to the processor circuit 130. The circuits 134, 136, and 140 may be implemented to process other protocols to meet the design criteria of a particular application.

The conversion circuit 142 may be configured to exchange data between the interface 102 and the IP processor 140, if necessary. In particular, the conversion circuit 142 may convert between the signal D1 at the interface 102 and another signal (e.g., D4) at the IP processor 140. The signal D1 may have an interface width defined by the network layer protocol. The signal D4 may have a width equal to or larger than the interface width of the signal D1. In one embodiment, the signal D1 may have a 32-bit width per the IP protocol while the signal D4 may have a 64-bit width.

In some implementations the conversion circuit 142 may be unnecessary. For example, both the interface width and the width of the signal D4 may be 32-bits wide per the IP protocol. In another example, both the signal D1 and the signal D4 may have a 64-bit width per an interface format of the IP processor 140. Where the signal D1 and the signal D4 are identical then the conversion circuit 142 may be eliminated.

The IP processor 140 may be configured to process the signal D4 received from the conversion circuit 142 to present the signal D3 to the detect circuit 138. The signal D3 may have the same width as the signal D4. The IP processor 140 may also be operational to process signals (e.g., D5A and D5B) received from the UDP processor 134 and/or the TCP processor 136 to present the signal D4 to the conversion circuit 142. The signals D5A and D5B may have the same width as the signal D4. The memory portion 132C may be coupled to the IP processor 140 to buffer data as part of the processing operation.

The detect circuit 138 may be configured to detect a protocol (e.g., TCP, UDP, etc.) within the signal D3. Once the protocol has been detected, the detect circuit 138 may be further configured to route the signal D3 to one of the processors 134 or 136 (e.g., a signal D3A to the TCP processor 136 or a signal D3B to the UDP processor 134) depending upon the protocol detected. The detect circuit 138 may be configured to route the signal D3 among other numbers of processors to meet the design criterial of a particular application.

The UDP processor 134 may be configured to process the signal D3B to present the signal D2. The UDP processor 134 may be further configured to process the signal D2 to present the signal D5B. The UDP processor 134 may be operational to transform between the UDP protocol and the session layer protocol. The memory portion 132A may be coupled to the UDP processor 134 to buffer data as part of the processing operation.

The TCP processor 136 may be configured to process the signal D3A to present the signal D2. The TCP processor 136 may also be configured to process the signal D2 to present the signal D5A. The TCP processor 136 may be operational to transform between the TCP protocol and the session layer protocol. The memory portion 132B may be coupled to the TCP processor 136 to buffer data as part of the processing.

Figure 5:
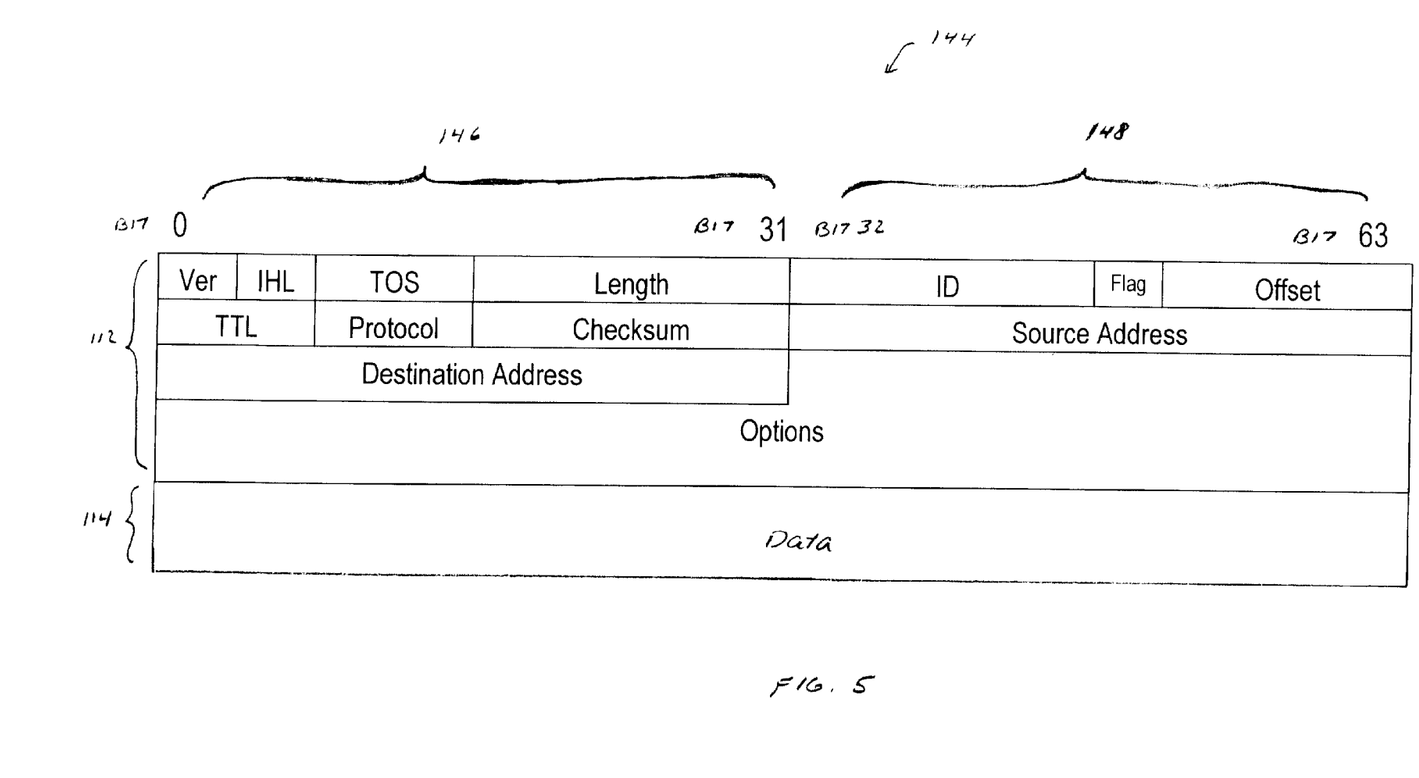
FIG. 5 is a layout of the IP datagram arranged 64 bits wide.

Referring to FIG. 5, an example of an alternative layout 144 of the signal D4 is shown. The signal D4 may be implemented with a width of 64 bits. When the signal D4 is implemented with a 64-bit width, consecutive rows of the IP header section 112 may be alternated between a lower 32-bit portion 146 and an upper 32-bit portion 148 of each row of the layout 144. Likewise, consecutive rows of the data payload section 114 may be alternated between the lower 32-bit portion 146 and the upper 32-bit portion 148. Other mappings between the IP datagram 110 and the signal D4 may be implemented to meet the design criteria of a particular application.

Figure 6:
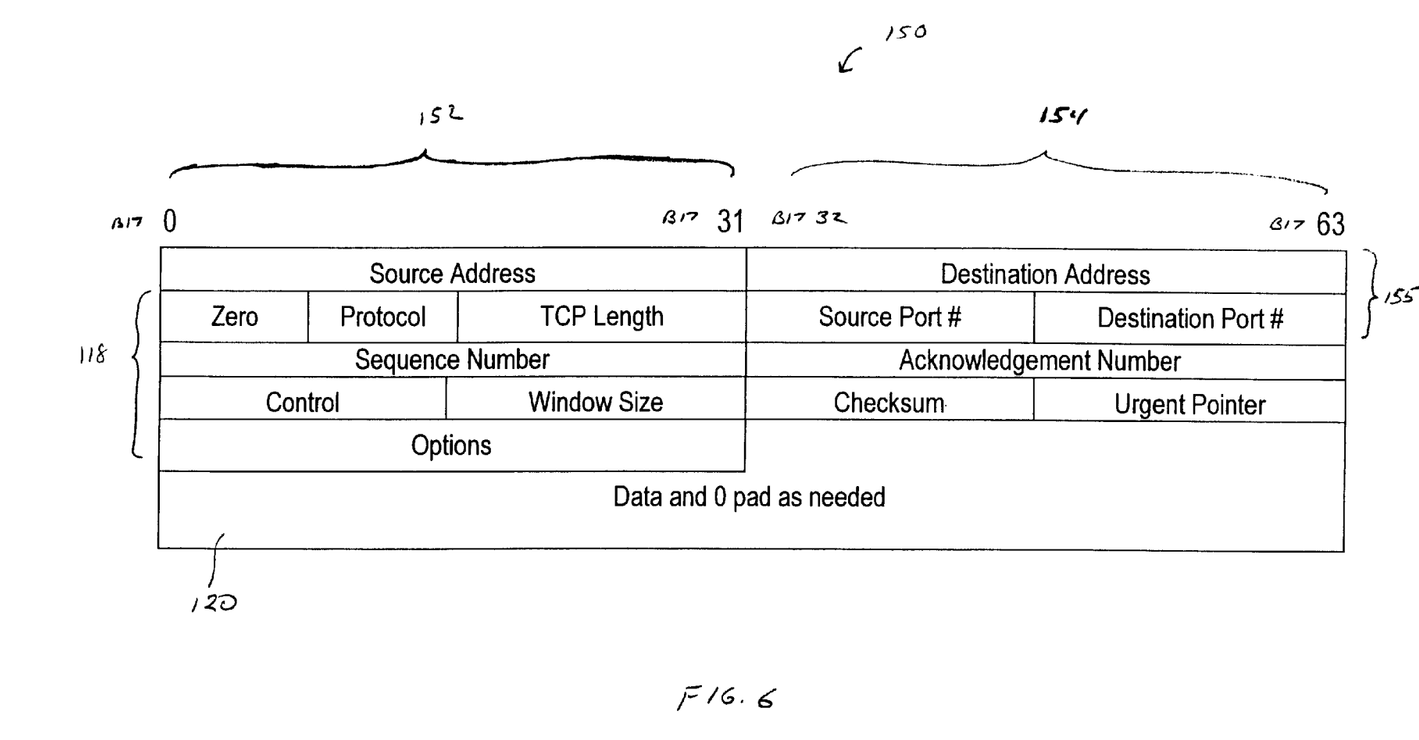
FIG. 6 is a layout of the TCP segment arranged 64 bits wide.

Referring to FIG. 6, an example of an alternative layout 150 of the signal D3A is shown. The signal D3A may be implemented having a width of 64 bits. When the signal D3A is implemented with a 64-bit width, consecutive rows of the TCP header section 118 may be alternated between a lower 32-bit portion 152 and an upper 32-bit portion 154 of each row of the layout 150. Consecutive rows of the data payload section 120 may be alternated between the lower 32-bit portion 152 and the upper 32-bit portion 154. A pseudo TCP header 155 may be provided above the TCP header section 118. The pseudo TCP header 155 may contain addresses and other information prefixed to the TCP header section 118. Other mappings between the TCP segment 116 and the signal D3A may be implemented to meet the design criteria of a particular application.

Figure 7:
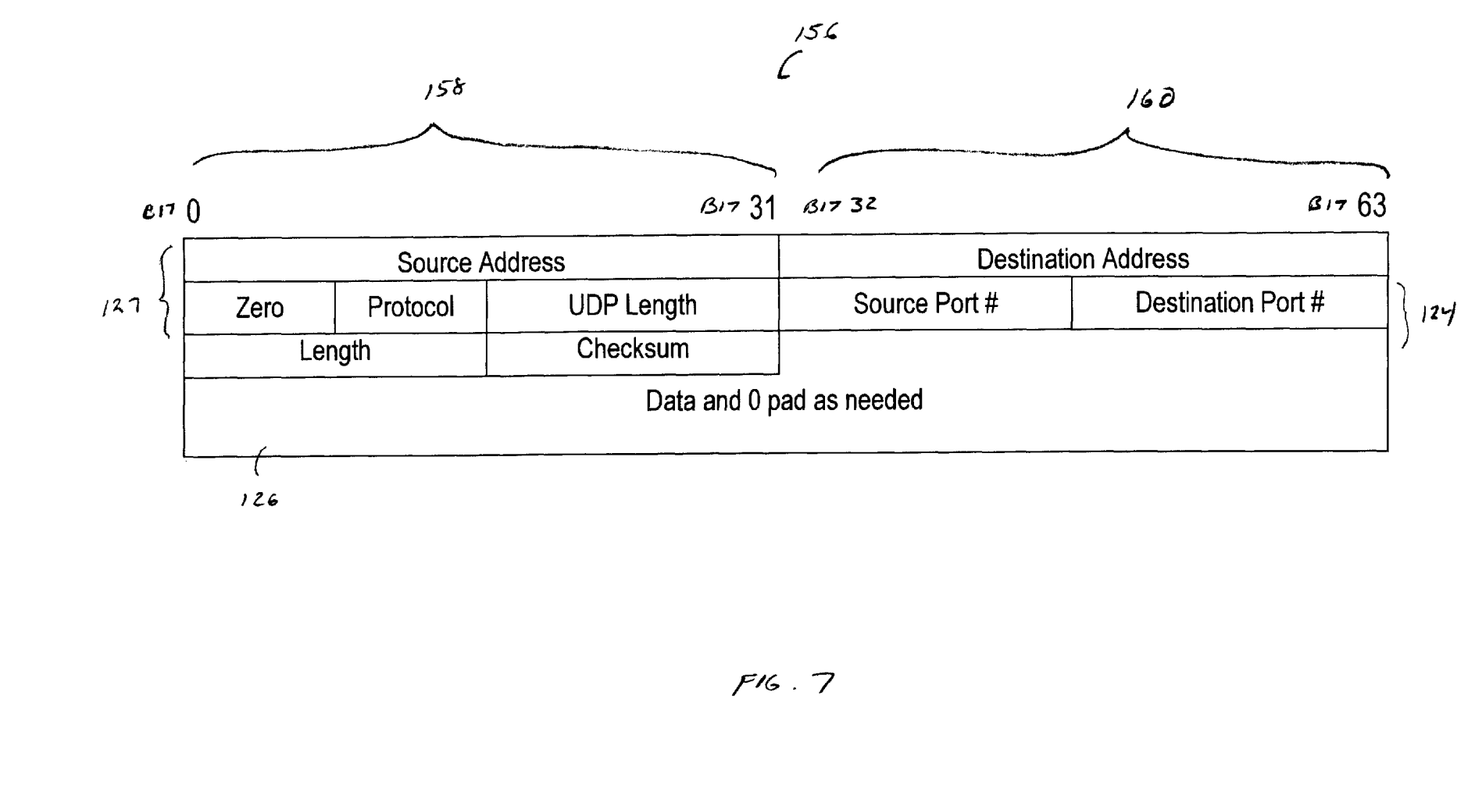
FIG. 7 is a layout of the UDP segment arranged 64 bits wide.

Referring to FIG. 7, an example of an alternative layout 156 of the signal D3B is shown. The signal D3B may be implemented having a width of 64 bits. When the signal D3B is implemented with a 64-bit width, consecutive rows of the UDP header section 124 may be alternated between a lower 32-bit portion 158 and an upper 32-bit portion 160 of each row of the layout 156. Consecutive rows of the data payload section 126 may be alternated between the lower 32-bit portion 158 and the upper 32-bit portion 160. A pseudo UDP header 127 may be provided above the UDP header section 124. The pseudo UDP header 127 may contain addresses and other information prefixed to the UDP header section 124. Other mappings between the UDP segment 122 and the signal D3B may be implemented to meet the design criteria of a particular application.

Figure 8:
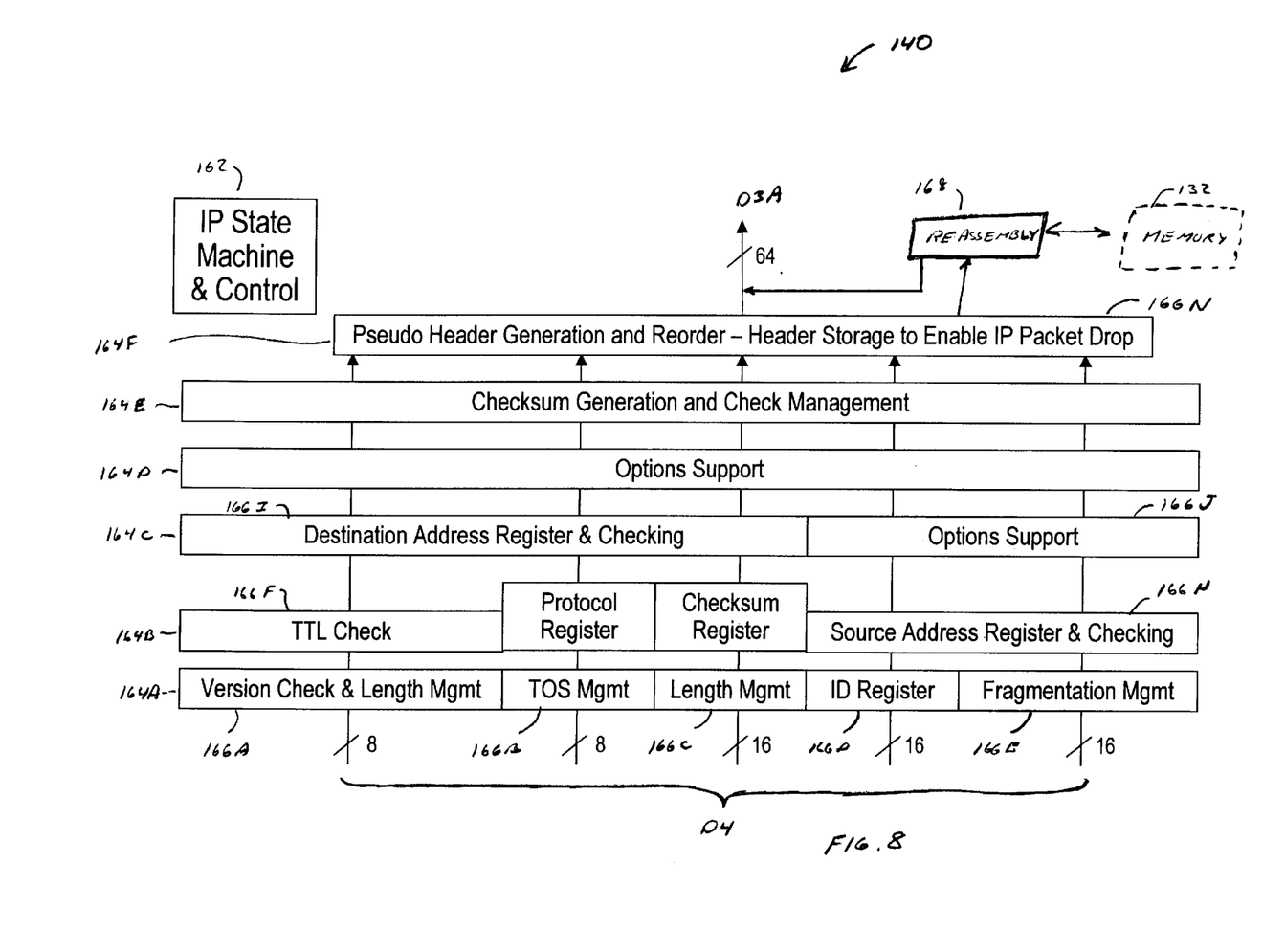
FIG. 8 is a detailed block diagram of an IP processor.

Referring to FIG. 8, a detailed block diagram of an example implementation of the IP processor 140 is shown. The IP processor 140 is generally configured as a circuit 162 and multiple rows 164A–F. Each row 164A–F may have one or more circuits 166A–N. At least one row 164 may have two or more circuit 166. The circuit 162 may be implemented as a state machine/controller. Each circuit 166A–N may be implemented as a logic block and/or register that may process a portion of the data. Control lines from the state machine/controller 162, other control lines (e.g., from an ID register 166D to a pseudo header generation logic block 166N), and registers for the option support logic block 166J are generally not shown to avoid clutter.

The signal D4 may be parsed into sub-signals having units of bytes or larger. Each sub-signal may represent one or more of the elements defined by the signal D4. The sub-signals may present the elements to some of the logic blocks 166. The parsing of the elements may be possible due to the known organization of the elements within the communication protocol.

The parsing may be performed by routing individual bytes that make up the signal D4 to predetermined logic blocks 166. For example, the least significant byte of the signal D4 may be coupled to the logic block 166A in the first row 164A and the logic block 166F in the second row 164B. Therefore, the elements VER and IHL (FIG. 5) of the IP protocol may be processed by the logic block 166A. Likewise, the elements TOS, LENGTH, and ID may be processed by the logic blocks 166B–D respectively. The elements FLAG and OFFSET may be processed by the logic block 166E. The element TTL may be processed by the logic block 166F, and so on.

The state machine/controller 162 may provide latch and operational control to each row 164A–F on successive clockings of 64-bit data arrivals within the signal D4 Data processing by the logic blocks 166A–N may continue up through higher successive rows 164 to generate the signal D3A. The logic blocks 166 in the higher rows 164 may receive data from the logic blocks 166 in the rows 164 below and/or directly from the signal D4.

Fragmentation management may be supported by storing the incoming frames in the memory 132. From storage in the memory 132, the fragmented packets may be reassembled and then presented to the next processor (e.g., the processor 134 or 136). A reassembly block 168 may be provided above the top row 164F to receive the fragments. The reassembly block 168 may be configured to reassemble the fragments into the memory 132. When reassembly is complete, the reassembly block 168 may wait for the signal D3A to become unused and may then present the completed packet in the memory 132 as the signal D3A. If support for IP fragmentation is unnecessary, then the reassembly block 168 and the memory 132 may not be required.

The IP processor 140 may configured to perform similar processing on the signal D5A to present the signal D4. As explained above, the IP processor 140 may include additional logic blocks 166 (not shown) arranged in the rows 164. The additional logic blocks 166 may be configured to transform the signal D5A into the signal D4. The signal D4 may then be presented to the converter circuit 142 for conversion to the layout of the signal D1.

Figure 9:
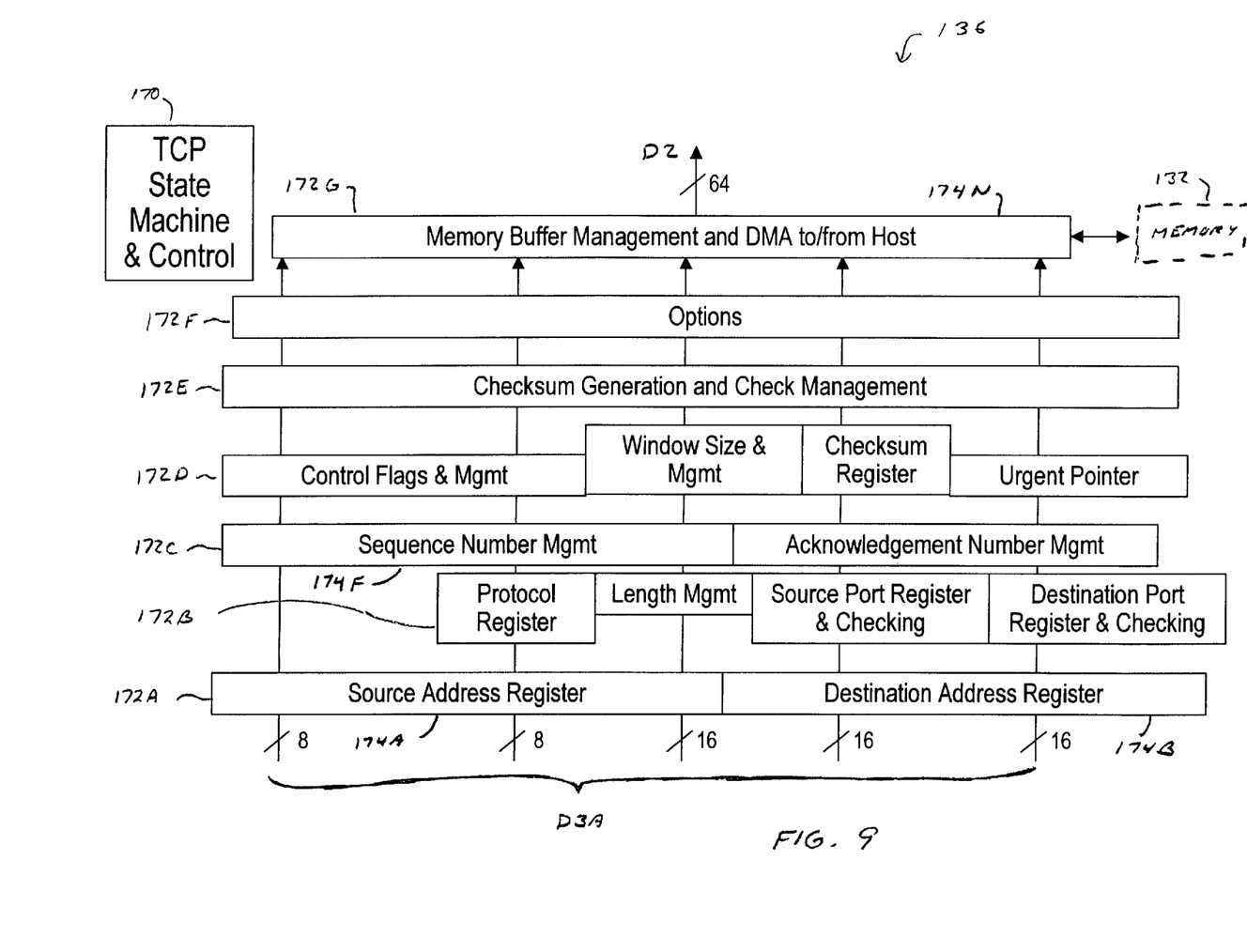
FIG. 9 is a detailed block diagram of a TCP processor.

Referring to FIG. 9, a detailed block diagram of an example implementation of the TCP processor 136 is shown. The TCP processor 136 is generally configured as a circuit 170 and multiple rows 172A–G. Each row 172A–G may have one or more circuits 174A–N. At least one row 172 may have two or more circuit 174. The circuit 170 may be implemented as a state machine/controller. Each circuit 174A–N may be implemented as a logic block and/or register that may process a portion of the data. Control lines from the state machine/controller 170, other control lines, and registers are generally not shown to avoid clutter.

The signal D3A may be parsed into sub-signals having units of bytes or larger. Each sub-signal may represent one or more of the elements defined by the signal D3A. The sub-signals may present the elements to some of the logic blocks 174. The parsing of the elements may be possible due to the known organization of the elements within the communication protocol.

The parsing may be accomplished by routing individual bytes of the signal D3A to predetermined logic blocks 174. For example, the two least significant bytes of the signal D3A may be coupled to the logic block 174F in the third row 172C to allow for processing of the sequence number element (described in connection with FIG. 6) of the TCP protocol. Examples of other allocations of the element of the signal D3A to the logic blocks 174 may be seen in the figure.

The state machine/controller 170 may provide latch and operational control to each row 172 on successive clockings of 64-bit data arrivals within the signal D3A. Data processing by the logic blocks 174 may continue up through higher successive rows 172 to generate the signal D2. The logic blocks 174 in the higher rows 172 may receive data from the logic blocks 174 in the rows 172 below and/or directly from the signal D3A.

Operation of the TCP processor 136 may be unique as compared with that of the UDP processor 134 and the IP processor 140. The TCP processor 136 may have transmit and receive paths that may be interdependent. The state machine/controller 170 may have access to the memory 132 to store a state of a connection. The state machine/controller 170 may also use the memory connection to modify the sequence numbers, resend packets, and send acknowledgment numbers per the TCP protocol. All packets, both transmitted and received, may be stored in the memory 132 during the above-mentioned procedures.

The TCP processor 136 may be configured to perform similar processing on the signal D2 to present the signal D5A. As explained above, the TCP processor 136 may include additional logic blocks 166 (not shown) arranged in the rows 164. The additional logic blocks 166 may be configured to transform the signal D2 into the signal D5A. The signal D5A may then be presented to the IP processor 140 for conversion into the signal D4.

Figure 10:
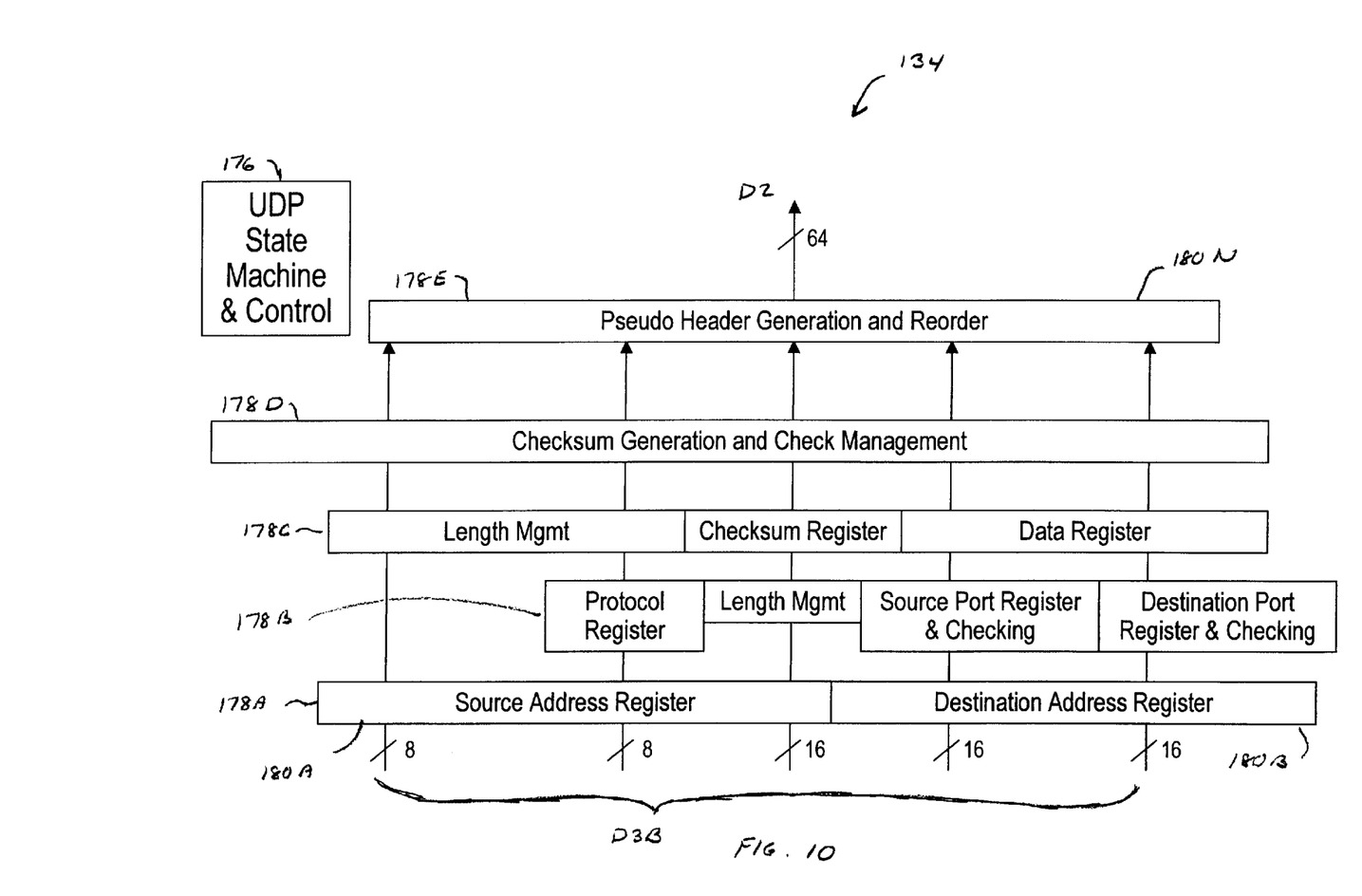
FIG. 10 is a detailed block diagram of a UDP processor.

Referring to FIG. 10, a detailed block diagram of an example implementation of the UDP processor 134 is shown. The UDP processor 134 is generally configured as a circuit 176 and multiple rows 178A–E. Each row 178A–E may have one or more circuits 180A–N. At least on row 178 may have two or more circuit 180. The circuit 176 may be implemented as a state machine/controller. Each circuit 180A–N may be implemented as a logic block and/or register that may process a portion of the data. Control lines from the state machine/controller 176, other control lines, and registers are generally not shown to avoid clutter.

The signal D3B may be parsed into sub-signals having units of bytes or larger. Each sub-signal may represent one or more of the elements defined by the signal D3B. The sub-signals may present the elements to some of the logic blocks 180. The parsing of the elements may be possible due to the known organization of the elements within the communication protocol.

The parsing may be accomplished by routing individual bytes of the signal D3B to predetermined logic blocks 180. For example, the four least significant bytes of the signal D3B may be coupled to the logic block 180A in the first row 178A to allow for processing of the source address element (FIG. 7). Examples of other allocations of the element of the signal D3B to the logic blocks 180 may be seen in the figure.

The state machine/controller 176 may provide latch and operational control to each row 178 on successive clockings of 64-bit data arrivals within the signal D3B. Data processing by the logic blocks 180 may continue up through higher successive rows 178 to generate the signal D2. The logic blocks 180 in the higher rows 178 may receive data from the logic blocks 180 in the rows 178 below and/or directly from the signal D3B.

The UDP processor 134 may be configured to perform similar processing on the signal D2 to present the signal D5B. As explained above, the UDP processor 134 may include additional logic blocks 180 (not shown) arranged in the rows 178. The additional logic blocks 180 may be configured to transform the signal D2 into the signal D5B. The signal D5B may then be presented to the IP processor 140 for conversion into the signal D4.

An advantage of the above design of the processors 134, 136, and 140 may be that multi-byte data may be received and processed as a single unit. In contrast, a processor circuit receiving only 8-bit wide signals may have to read several bytes of data into the processor and reassemble the data before any processing may be performed. Another advantage of the above design of the processor circuit 130 is that the data may be presented in up to 64-bit words. As such, the processor circuit 130 may operate at a data rate of 10 Gbps using a 156.25 MHz clocking rate. If the processor circuit 130 is implemented to have 32-bit width data paths, then the 10 Gbps data rate may be achieved with a clocking rate of approximately 312 MHz.

Figure 11:
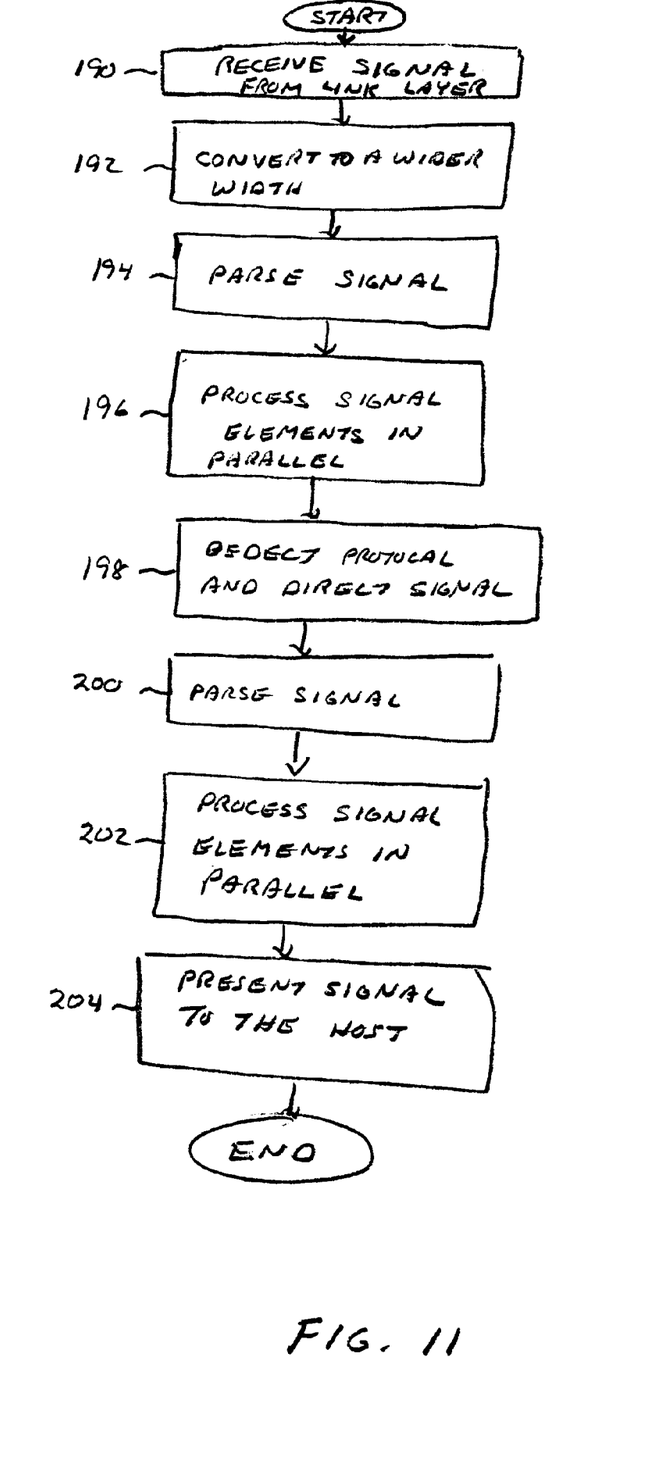
FIG. 11 is a flow diagram of a method for processing data up through a protocol stack.

Referring to FIG. 11, a flow diagram of an example method of operating the system 100 is shown. The method may convey data up the protocol stack from the link layer 104 to the session layer (e.g., the host 108). The process may start upon a receipt of data in the 32-bit wide signal D1 from the link layer per a communication protocol (e.g., block 190). The signal D1 may then be expanded into the 64-bit wide signal D4 by the conversion circuit 142 (e.g., block 192). The signal D4 may then be parsed 64 bits at a time into sub-signals (e.g., block 194). Each sub-signal may hold one or more elements in one or more bytes. The IP processor 140 may then process the elements in parallel rows of the logic blocks 166 to produce the signal D3 in accordance with another communication protocol (e.g., block 196). The detect circuit 138 may then detect a protocol of the signal D3 and direct the signal D3 to the UDP processor 134 or the TCP processor 136 (e.g., block 198).

The signal D3 may be parsed 64 bits at a time into sub-signals (e.g., block 200). Each sub-signal may hold one or more elements in one or more bytes. The receiving processor 134/136 may then process the elements in parallel rows of logic blocks 174/180 to produce the signal D2 having another communication protocol (e.g., block 202). Finally, the signal D2 may be presented to the host 108 (e.g., block 204).

Figure 12:
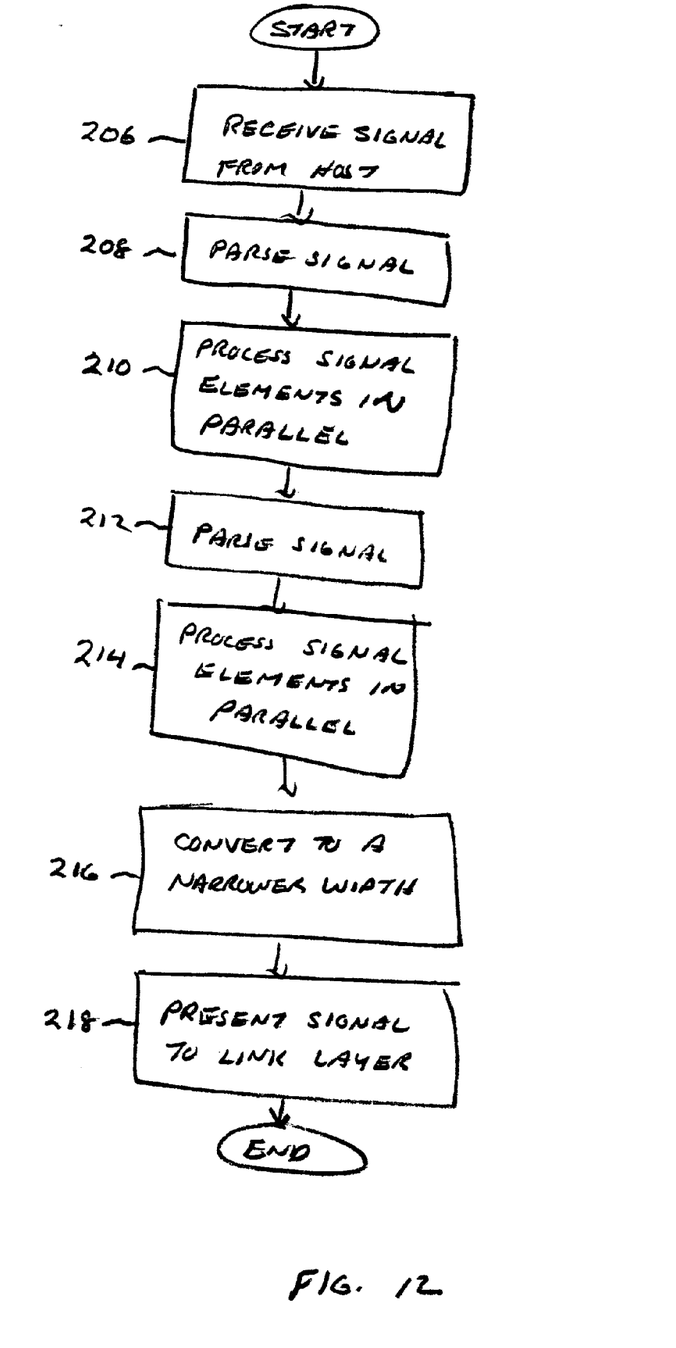
FIG. 12 is a flow diagram of a method for processing data down through the protocol stack.

Referring to FIG. 12, a flow diagram of another example method of operating the system 100 is shown. The other method may convey data down the protocol stack from the session layer (e.g., the host 108) to the link layer 104. The process may start upon receipt of the signal D2 from the host 108 per a communication protocol (e.g., block 204). The signal D2 may be parsed 64 bits at a time into sub-signals (e.g., block 208). Each sub-signal may hold one or more elements in one or more bytes. The processor 134/136 may then process the elements in parallel rows of logic blocks 174/180 to produce the signal D5 (e.g., D5A or D5B) per another communication protocol (e.g., block 210).

The signal D5 may be parsed 64 bits at a time into sub-signals (e.g., block 212). Each sub-signal may hold one or more elements in one or more bytes. The IP processor 140 may then process the elements in parallel rows of logic blocks 166 to produce the signal D4 (e.g., block 214). The converter circuit 142 may reduce the 64-bit wide signal D4 into the 32-bit wide signal D1 (e.g., block 216). Finally, the signal D1 may be presented to the link layer 104 (e.g., block 218).

The present invention may also be implemented by the preparation of ASICs, FPGAs, or by interconnecting an appropriate network of conventional component circuits (such as conventional circuit implementing a state machine), as is described herein, modifications of which will be readily apparent to those skilled in the art(s).

While the invention has been particularly shown and described with reference to the preferred embodiments thereof, it will be understood by those skilled in the art that various changes in form and details may be made without departing from the spirit and scope of the invention.

What is claimed is:

1. A circuit comprising:
   a first processor configured to convert data between a first communication protocol and a second communication protocol, said first processor having a plurality of first rows each having at least one first block each configured to process a portion of said data, at least one of said first rows has a plurality of said first blocks; and
   a second processor configured to convert said data between said second communication protocol and a third communication protocol, said second processor having a plurality of second rows each having at least one second block each configured to process a portion of said data, at least one of said second row has a plurality of said second blocks.

2. The circuit according to claim 1, further comprising a third processor configured to convert said data between said second communication protocol and a fourth communication protocol, said third processor having a plurality of third rows each having at least one third block each configured to process a portion of said data, at least one of said third row has a plurality of said third blocks.

3. The circuit according to claim 2, further comprising a detect circuit configured to (i) detect a protocol associated with said data and (ii) direct said data from said first processor to one of said second processor and said third processor in response to said protocol.

4. The circuit according to claim 1, further comprising a conversion circuit configured to exchange said data between said first processor and an interface, said first processor having a first width wider than an interface width of said interface.

5. The circuit according to claim 1, wherein said first communication protocol comprises a data link layer protocol of a protocol stack.

6. The circuit according to claim 5, wherein said second communication protocol comprises a network layer protocol of said protocol stack.

7. The circuit according to claim 6, wherein said third communication protocol comprises a transport layer protocol of said protocol stack.

8. The circuit according to claim 1, wherein said first communication protocol comprises an Internet Protocol.

9. The circuit according to claim 8, wherein said second communication protocol comprises one of a Transmission Control Protocol and a User Datagram Protocol.

10. The circuit according to claim 1, wherein said first processor and said second processor are hardware-only implementations.

11. A method of processing data through a protocol stack, comprising the steps of:
   (A) receiving said data as a first signal having a first communication protocol;
   (B) first parsing said first signal into a plurality of first sub-signals, wherein each of said first sub-signals has at least one first element and at least one of said first sub-signals has a plurality of said first elements;
   (C) first processing said first sub-signals to present a second signal having a second communication protocol in response to said first parsing;
   (D) second parsing said second signal into a plurality of second sub-signals in response to said first processing, wherein each of said second sub-signals has at least one second element and at least one of said second sub-signals has a plurality of said second elements; and
   (E) second processing said second sub-signals to present a third signal having a third communication protocol in response to said second parsing.

12. The method according to claim 11, further comprising the steps of:
   third parsing said second signal into a plurality of third sub-signals in response to said first processing, wherein each of said third sub-signals has at least one third element and at least one of said third sub-signals has a plurality of said third elements; and
   third processing said third sub-signals to present a fourth signal having a fourth communication protocol in response to said third parsing.

13. The method according to claim 12, further comprising the steps of:
   detecting a protocol of said second signal in response to said first processing; and
   directing said second signal between said second processing and said third processing in response to said detecting.

14. The method according to claim 11, further comprising the step of arranging said data to expand a width of said first signal prior to said receiving.

15. The method according to claim 11, further comprising the steps of:
   fourth processing said third signal to present said second signal; and
   fifth processing said second signal to present said first signal in response to said fourth processing.

16. The method according to claim 15, further comprising the step of sixth processing said fourth signal to present said second signal prior to said fifth processing.

17. The method according to claim 15, further comprising the step of arranging said data to reduce a width of said first signal in response to said fifth processing.

18. The method according to claim 11, further comprising the step of transforming said data at least two layers of a protocol stack in response to said first processing and said second processing.

19. A circuit comprising:
   means for receiving data as a first signal having a first communication protocol;
   first means for parsing said first signal into a plurality of first sub-signals, wherein each of said first sub-signals has at least one first element and at least one of said first sub-signals has a plurality of said first elements;
   first means for processing said first sub-signals to present a second signal having a second communication protocol;
   second means for parsing said second signal into a plurality of second sub-signals, wherein each of said second sub-signals has at least one second element and at least one of said second sub-signals has a plurality of said second elements; and
   second means for processing said second sub-signals to present a third signal having a third communication protocol.

* * * * *